V. H. EMERSON.
SOUND RECORD AND THE PRODUCTION THEREOF.
APPLICATION FILED JAN. 7, 1914.

1,145,360.

Patented July 6, 1915.

UNITED STATES PATENT OFFICE.

VICTOR H. EMERSON, OF NEW YORK, N. Y., ASSIGNOR TO AMERICAN GRAPHOPHONE COMPANY, OF BRIDGEPORT, CONNECTICUT, A CORPORATION OF WEST VIRGINIA.

SOUND-RECORD AND THE PRODUCTION THEREOF.

1,145,360.　　　　Specification of Letters Patent.　　Patented July 6, 1915.

Application filed January 7, 1914. Serial No. 810,835.

*To all whom it may concern:*

Be it known that I, VICTOR H. EMERSON, a citizen of the United States, and a resident of the city, county, and State of New York, (whose post-office address is 102 West Thirty-eighth street, New York city, New York,) have invented a new and useful Improvement in Sound-Records and the Production Thereof, which invention is fully set forth in the following specification.

This invention relates primarily to sound-records having laterally-undulating sound-grooves and known as "zigzag records," and consists of a new recording-material, a new arrangement of devices for producing the record-grooves, a new process of producing the grooves, and the new sound-record itself.

Sound-records have hitherto been made by the use of cutting-tools whose sharp edges operate to cut the material out and remove it from the tablet leaving cleanly-cut record-grooves. It has also been proposed to make sound-records by a tool which should merely plow, or otherwise trace, its path through the surface of the tablet without cutting out and removing the material; but such plowing-action, or displacement, causes an upheaval of the material in the form of ridges forced up on both sides of the groove, which have to be removed by subsequent treatment.

The object of the present invention is to employ the displacing-operation without producing upheaval of the material above the normal surface of the tablet.

In carrying out the invention the body of the recording-tablet is formed of a yielding and compressible material that can be forced downward (with slight tendency to upheaval); and this is covered with a cohesive surface or skin, which prevents or smothers any tendency to upheaval; and a sharp-edged recording-stylus is used,—not, however, in the usual manner, but by being dragged backward—to provide sharply-defined indentations in the sides of the grooves.

The invention may be practised in different ways and with different materials, but will be best understood by reference to the accompanying drawings and the annexed description, which relate to a preferred embodiment thereof for producing a zigzag record-groove upon a flat tablet, preferably a disk having the record-groove arranged spirally thereon.

Figure 1:
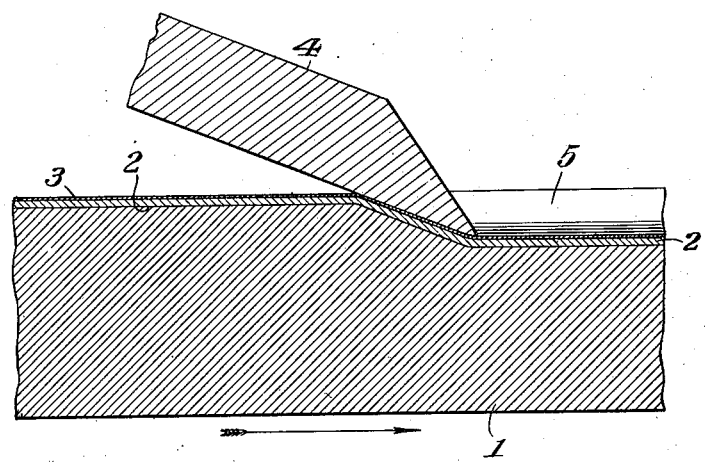
Figure 2:
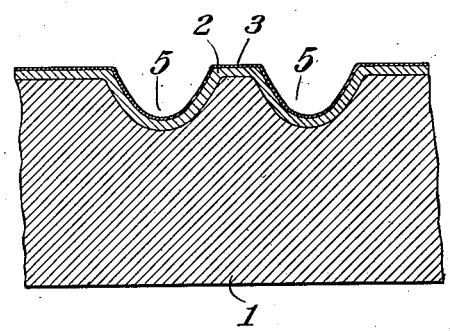

In the drawings, Figure 1 is a sectional view, greatly enlarged in size, taken longitudinally through a partly-finished record-groove and a fragment of the tablet, showing the lower portion of the recording-stylus in operative position; and Fig. 2 is a sectional view, on the same scale, taken transversely through two record-grooves and a portion of the tablet.

The body of the tablet 1 is composed of a plastic and compressible material, such as a mixture of beeswax and resin, preferably half and half, and which may be warmed up immediately before making a record. The surface of the tablet is covered with a skin 2 of tin-foil or the like; and, preferably, the upper surface of the tin-foil may be treated to a light graphiting to reduce friction. In the drawings the thickness of the tin-foil 2 is very much exaggerated and the graphite film 3 is enormously exaggerated. The usual stylus employed in cutting out zigzag record-grooves (and connected to the diaphragm of a sound-box, not shown) is represented at 4; but, instead of cutting its way forward (toward the right in Fig. 1) it is dragged in the opposite direction, with its point rearward. In actual practice, of course, the stylus is not advanced, but the record-tablet itself is propelled beneath the stylus by any well-known mechanism (not shown). In Fig. 1 the tablet is supposed to be traveling toward the right, as indicated by the arrow, and the stylus 4 is engaged in producing the record-groove 5. The sharp edge of this dragging-stylus 4 does not cut the material 1, but (in the absence of the tin-foil skin 2) it might perform some scraping-action, and certainly its displacing-action would cause the upheaval of some of the material (as ridges on the sides of the groove). But the tin-foil or other skin 2 protects the surface of the recording-material 1 from being scraped or otherwise removed by the stylus; the material is compressed downwardly; and the tin-foil 2 is embossed (under more or less tension or stress), as indicated in Fig. 2. This stretching of the tin-foil prevents or smothers any upheaval of the material 1. When the stylus is vibrated laterally, in recording, its sharp edges serve to produce clearly-defined transverse indentations in the walls of the record-groove.

The result in practising the invention is a record-tablet having a smooth plane surface, unbroken except by the concavities of the clearly-defined record-grooves, and without any furrows rising above the normal level; and the (graphited) tin-foil or other skin remains as an unbroken surfacing that extends not only over the plane surface but down the sides and in the bottoms of the grooves. The original sound-record thus produced could be employed directly upon a suitable talking-machine, for obtaining audible reproductions; but it is primarily intended as a "master" from which to make duplicate records, as by the well-known electroplating process, since its surface is already electro-conductive.

The invention may be carried out within a wide range of modifications, and is not limited to the precise ingredients and details above set forth.

The invention having thus been fully described, what is claimed is:

The process of making a sound-record, which consists of displacing a compressible material by dragging a sharp-edged stylus backward along the surface thereof, vibrating the same by and in accordance with sound-waves, and simultaneously preventing and smothering any upheaval of said material.

In testimony whereof I have signed this specification in the presence of two subscribing witnesses.

VICTOR H. EMERSON.

Witnesses:
RALPH L. SCOTT,
WALTER A. FORBUSH.